United States Patent
Cowings et al.

(10) Patent No.: US 8,010,609 B2
(45) Date of Patent: Aug. 30, 2011

(54) METHOD AND APPARATUS FOR MAINTAINING REPUTATION LISTS OF IP ADDRESSES TO DETECT EMAIL SPAM

(75) Inventors: David Cowings, El Cerrito, CA (US); Sanford Jensen, Berkeley, CA (US); Carlin Wiegner, Menlo Park, CA (US)

(73) Assignee: Symantec Corporation, Mountain View, CA (US)

( * ) Notice: Subject to any disclaimer, the term of this patent is extended or adjusted under 35 U.S.C. 154(b) by 1214 days.

(21) Appl. No.: 11/157,326

(22) Filed: Jun. 20, 2005

(65) Prior Publication Data

US 2006/0288076 A1    Dec. 21, 2006

(51) Int. Cl.
*G06F 15/16* (2006.01)

(52) U.S. Cl. ............ 709/206; 709/223; 379/93.24; 379/100.08; 379/100.09; 379/265.09

(58) Field of Classification Search .......... 709/206, 709/223; 726/1, 4, 13; 379/93.24, 100.08, 379/100.09, 265.09
See application file for complete search history.

(56) References Cited

U.S. PATENT DOCUMENTS

| | | |
|---|---|---|
| 5,121,345 A | 6/1992 | Lentz |
| 5,377,354 A | 12/1994 | Scannell et al. |
| 5,438,433 A | 8/1995 | Reifman et al. |
| 5,440,723 A | 8/1995 | Arnold et al. |
| 5,537,540 A | 7/1996 | Miller et al. |
| 5,557,789 A | 9/1996 | Mase et al. |
| 5,619,648 A | 4/1997 | Canale et al. |
| 5,634,005 A | 5/1997 | Matsuo |
| 5,649,182 A | 7/1997 | Reitz |
| 5,675,507 A | 10/1997 | Bobo, II |
| 5,678,041 A | 10/1997 | Baker et al. |
| 5,696,898 A | 12/1997 | Baker et al. |
| 5,790,789 A | 8/1998 | Suarez |
| 5,796,948 A | 8/1998 | Cohen |
| 5,802,277 A | 9/1998 | Cowlard |
| 5,809,242 A | 9/1998 | Shaw et al. |
| 5,822,527 A | 10/1998 | Post |

(Continued)

FOREIGN PATENT DOCUMENTS

EP    0375138    6/1990

(Continued)

OTHER PUBLICATIONS

International Search Report in Application No. PCT/US2006/024178 Mailed Dec. 8, 2006.

(Continued)

*Primary Examiner* — Thu Ha T Nguyen
(74) *Attorney, Agent, or Firm* — Meyertons, Hood, Kivlin, Kowert & Goetzel, P.C.; Dean M. Munyon

(57) ABSTRACT

A method and system to maintain lists of IP addresses for detection of email spam are described. In one embodiment, the method includes receiving email messages from senders associated with Internet Protocol (IP) addresses, filtering the email messages to identify spam, and sending statistics pertaining to the email messages and the identified spam to a server. The method further includes receiving, from the server, IP address lists generated based on the statistics, and filtering new email messages using the IP address lists. The IP address lists received from the server may include a list of safe IP addresses, a list of suspect IP addresses and a list of open proxy IP addresses.

13 Claims, 10 Drawing Sheets

U.S. PATENT DOCUMENTS

| | | | |
|---|---|---|---|
| 5,826,022 | A | 10/1998 | Nielsen |
| 5,835,087 | A | 11/1998 | Herz et al. |
| 5,845,263 | A | 12/1998 | Camaisa et al. |
| 5,862,325 | A | 1/1999 | Reed et al. |
| 5,864,684 | A | 1/1999 | Nielsen |
| 5,870,546 | A | 2/1999 | Kirsch |
| 5,870,548 | A | 2/1999 | Nielsen |
| 5,874,955 | A | 2/1999 | Rogowitz et al. |
| 5,884,033 | A * | 3/1999 | Duvall et al. ............... 709/206 |
| 5,889,943 | A | 3/1999 | Ji et al. |
| 5,905,863 | A | 5/1999 | Knowles et al. |
| 5,919,257 | A | 7/1999 | Trostle |
| 5,930,479 | A | 7/1999 | Hall |
| 5,956,481 | A | 9/1999 | Walsh et al. |
| 5,968,117 | A | 10/1999 | Schuetze |
| 5,978,837 | A | 11/1999 | Foladare et al. |
| 5,999,932 | A | 12/1999 | Paul |
| 5,999,967 | A | 12/1999 | Sundsted |
| 6,023,700 | A | 2/2000 | Owens et al. |
| 6,023,723 | A | 2/2000 | McCormick et al. |
| 6,052,709 | A * | 4/2000 | Paul ............................ 709/202 |
| 6,073,165 | A | 6/2000 | Narasimhan et al. |
| 6,088,804 | A | 7/2000 | Hill et al. |
| 6,112,227 | A | 8/2000 | Heiner |
| 6,146,026 | A | 11/2000 | Ushiku |
| 6,157,630 | A | 12/2000 | Adler et al. |
| 6,158,031 | A | 12/2000 | Mack et al. |
| 6,161,130 | A | 12/2000 | Horvitz et al. |
| 6,173,364 | B1 | 1/2001 | Zenchelsky et al. |
| 6,182,118 | B1 | 1/2001 | Finney et al. |
| 6,182,227 | B1 | 1/2001 | Blair et al. |
| 6,189,026 | B1 | 2/2001 | Birrell et al. |
| 6,195,686 | B1 | 2/2001 | Moon et al. |
| 6,199,102 | B1 | 3/2001 | Cobb |
| 6,216,165 | B1 | 4/2001 | Woltz et al. |
| 6,226,630 | B1 | 5/2001 | Billmers |
| 6,230,156 | B1 | 5/2001 | Hussey |
| 6,266,774 | B1 | 7/2001 | Sampath et al. |
| 6,272,641 | B1 | 8/2001 | Ji |
| 6,314,454 | B1 | 11/2001 | Wang et al. |
| 6,321,267 | B1 * | 11/2001 | Donaldson ................... 709/229 |
| 6,327,610 | B2 | 12/2001 | Uchida et al. |
| 6,330,588 | B1 | 12/2001 | Freeman |
| 6,334,140 | B1 | 12/2001 | Kawamata |
| 6,360,254 | B1 | 3/2002 | Linden et al. |
| 6,377,949 | B1 | 4/2002 | Gilmour |
| 6,393,568 | B1 | 5/2002 | Ranger et al. |
| 6,411,947 | B1 | 6/2002 | Rice et al. |
| 6,421,709 | B1 | 7/2002 | McCormick et al. |
| 6,438,125 | B1 | 8/2002 | Brothers |
| 6,438,608 | B2 | 8/2002 | Biliris et al. |
| 6,466,966 | B1 | 10/2002 | Kirsch et al. |
| 6,505,237 | B2 | 1/2003 | Beyda et al. |
| 6,523,120 | B1 | 2/2003 | Strasnick |
| 6,546,416 | B1 | 4/2003 | Kirsch |
| 6,549,957 | B1 | 4/2003 | Hanson et al. |
| 6,571,275 | B1 | 5/2003 | Dong et al. |
| 6,654,787 | B1 | 11/2003 | Aronson et al. |
| 6,671,812 | B1 | 12/2003 | Balasubramaniam et al. |
| 6,718,321 | B2 | 4/2004 | Birrell et al. |
| 6,732,157 | B1 | 5/2004 | Gordon et al. |
| 6,757,713 | B1 | 6/2004 | Ogilvie et al. |
| 6,785,732 | B1 | 8/2004 | Bates et al. |
| 6,792,543 | B2 | 9/2004 | Pak et al. |
| 6,836,272 | B2 | 12/2004 | Leung et al. |
| 6,859,833 | B2 | 2/2005 | Kirsch et al. |
| 7,010,698 | B2 | 3/2006 | Sheymov |
| 7,072,944 | B2 | 7/2006 | Lalonde et al. |
| 7,093,121 | B2 | 8/2006 | Barton et al. |
| 7,096,500 | B2 | 8/2006 | Roberts et al. |
| 7,114,177 | B2 | 9/2006 | Rosenberg et al. |
| 7,206,814 | B2 * | 4/2007 | Kirsch ......................... 709/206 |
| 7,272,853 | B2 * | 9/2007 | Goodman et al. ............. 726/13 |
| 7,315,893 | B2 | 1/2008 | Vinberg |
| 7,331,062 | B2 | 2/2008 | Alagna et al. |
| 7,395,657 | B2 | 7/2008 | Johnson |
| 7,409,708 | B2 * | 8/2008 | Goodman et al. ............. 726/13 |
| 7,451,487 | B2 | 11/2008 | Oliver et al. |
| 2002/0007301 | A1 | 1/2002 | Reuning |
| 2002/0046065 | A1 | 4/2002 | Nighan |
| 2002/0116635 | A1 | 8/2002 | Sheymov |
| 2002/0147780 | A1 | 10/2002 | Liu et al. |
| 2002/0150243 | A1 | 10/2002 | Craft et al. |
| 2002/0174137 | A1 | 11/2002 | Wolff et al. |
| 2003/0023722 | A1 | 1/2003 | Vinberg |
| 2003/0033536 | A1 | 2/2003 | Pak et al. |
| 2003/0097451 | A1 | 5/2003 | Bjorksten et al. |
| 2003/0159070 | A1 | 8/2003 | Mayer et al. |
| 2003/0174137 | A1 | 9/2003 | Leung et al. |
| 2004/0054917 | A1 | 3/2004 | Obrecht et al. |
| 2004/0064736 | A1 | 4/2004 | Obrecht et al. |
| 2004/0078422 | A1 | 4/2004 | Toomey |
| 2004/0088570 | A1 | 5/2004 | Roberts et al. |
| 2004/0098607 | A1 | 5/2004 | Alagna et al. |
| 2004/0123157 | A1 | 6/2004 | Alagna et al. |
| 2004/0177120 | A1 | 9/2004 | Kirsch et al. |
| 2004/0187023 | A1 | 9/2004 | Alagna et al. |
| 2004/0230820 | A1 | 11/2004 | Hui Hsu et al. |
| 2005/0022031 | A1 * | 1/2005 | Goodman et al. ............ 713/201 |
| 2005/0050222 | A1 | 3/2005 | Packer |
| 2005/0081059 | A1 | 4/2005 | Bandini et al. |
| 2005/0108339 | A1 | 5/2005 | Gleeson et al. |
| 2005/0108340 | A1 | 5/2005 | Gleeson et al. |
| 2005/0137980 | A1 | 6/2005 | Bullock et al. |
| 2005/0216587 | A1 * | 9/2005 | John ............................ 709/225 |
| 2006/0015564 | A1 * | 1/2006 | Angelica ...................... 709/206 |
| 2006/0026246 | A1 * | 2/2006 | Fukuhara et al. ............. 709/206 |
| 2006/0031298 | A1 | 2/2006 | Hasegawa |
| 2006/0053490 | A1 | 3/2006 | Herz et al. |
| 2006/0101120 | A1 * | 5/2006 | Helsper et al. ................ 709/206 |
| 2006/0168006 | A1 * | 7/2006 | Shannon et al. .............. 709/206 |
| 2006/0168066 | A1 * | 7/2006 | Helsper et al. ................ 709/206 |
| 2006/0251068 | A1 | 11/2006 | Judge et al. |
| 2007/0118607 | A1 * | 5/2007 | Nelissen ....................... 709/217 |
| 2007/0143432 | A1 | 6/2007 | Klos et al. |
| 2007/0204026 | A1 * | 8/2007 | Berger .......................... 709/223 |
| 2008/0052758 | A1 * | 2/2008 | Byrnes ............................. 726/1 |

FOREIGN PATENT DOCUMENTS

| | | |
|---|---|---|
| EP | 0420779 | 4/1991 |
| EP | 0720333 | 7/1996 |
| GB | 2271002 | 3/1994 |
| JP | 10240649 | 11/1998 |
| WO | 9635994 | 11/1996 |
| WO | 9837680 | 8/1998 |
| WO | 0203178 | 1/2002 |
| WO | 02/28127 A1 | 4/2002 |
| WO | 02103533 | 12/2002 |
| WO | 2004021197 | 3/2004 |
| WO | WO 02/28127 | 4/2004 |
| WO | 2004055632 | 7/2004 |
| WO | 2004072777 | 8/2004 |
| WO | 2004/081734 A3 | 9/2004 |
| WO | WO 2004/081734 | 9/2004 |

OTHER PUBLICATIONS

International Preliminary Report on Patentability, International Application No. PCT/US2006/024178, mailed Jan. 10, 2008.

Clark et al., "PCMAIL: A Distributed Mail System for Personal Computers," May 1986, MIT Laboratory for Computer Science, 28 Pages (1-28).

Harker, R., "Selectively Rejecting SPAM Using Sendmail," Proceedings of the Eleventh Systems Administration Conference, abstract only, Oct. 1997.

Gaskin, J.E., "Don't Get Spammed," Information Week, Aug. 18, 1997, retrieved from Internet: http://www.informationweek.com/644/44olspm.htm, 9 pages.

Ranum, M.J. et al., "Implementing a Generalized Tool for Network Monitoring," Proceedings of the Eleventh Systems Administration Conference (LISA XI), San Diego, CA, Oct 26-31, 1997, pp. 1-8.

Kaufman, et al., "Network Security: Private Communication in a Public World—Revocation—Section 15.4," 2nd Edition, Prentice Hall Series in Computer Networking and Distributed Systems, 2002, 4 pages.

U.S. Appl. No. 10/117,065, entitled "Apparatus and Method for Weighted and Aging Spam Filtering Rules," by Sunil Paul, et al., filed Apr. 4, 2002.

U.S. Appl. No. 10/871,583, entitled "System and Method for Filtering Spam Messages Utilizing URL Filtering Module," by Cowings, et al., filed Jun. 17, 2004.

U.S. Appl. No. 10/949,465, entitled "System and Method for Filtering Fraudulent Email Messages," by Bruno, et al., filed Sep. 24, 2004.

U.S. Appl. No. 11/048,958, entitled "Method and Apparatus for Determining the Source of an Email Message," by Mantel, filed Feb. 1, 2005.

U.S. Appl. No. 11/157,327, entitled "Method and Apparatus for Grouping Spam Email Messages," by Jensen, filed Jun. 20, 2005.

U.S. Appl. No. 11/127,813, entitled "Method and Apparatus for Simulating End User Responses to Spam Email Messages," by Khalsa, et al., filed May 11, 2005.

U.S. Appl. No. 11/116,572, entitled "Method and Apparatus for Creating Aggressive Anti-Spam Rules," by Chin, et al., filed Apr. 27, 2005.

* cited by examiner

METHOD AND APPARATUS FOR MAINTAINING REPUTATION LISTS OF IP ADDRESSES TO DETECT EMAIL SPAM

FIELD OF THE INVENTION

The present invention relates to filtering electronic mail (email); more particularly, the present invention relates to maintaining reputation lists of IP addresses for detection of email spam.

BACKGROUND OF THE INVENTION

In recent years, spam has become a major problem for all Internet users. As the cost of processing power, email address acquisition and email software continue to fall, spam becomes increasingly cost-effective for spammers. Given the negligible cost involved in sending millions of unsolicited email messages, spammers need only capture a small response rate to make a profit. The growth trend of spam shows no sign of abating. According to recent statistics, spam currently accounts for over half of all email traffic in the U.S. This increase in both the volume and percentage of spam is not only worsening a resource drain for IT, it is also affecting how end users view email, which has become the primary form of communication in the enterprise.

Presently, there are products for filtering out unwanted email messages. However, these products typically fail to effectively compensate for the escalating volumes of spam.

SUMMARY OF THE INVENTION

A method and system to maintain lists of IP addresses for detection of email spam are described. According to one aspect, the method includes receiving email messages from senders associated with Internet Protocol (IP) addresses, filtering the email messages to identify spam, and sending statistics pertaining to the email messages and the identified spam to a server. The method further includes receiving, from the server, IP address lists generated based on the statistics, and filtering new email messages using the IP address lists. The IP address lists received from the server may include a list of safe IP addresses, a list of suspect IP addresses and a list of open proxy IP addresses.

Other features of the present invention will be apparent from the accompanying drawings and from the detailed description that follows.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PRESENT INVENTION

Figure 1:
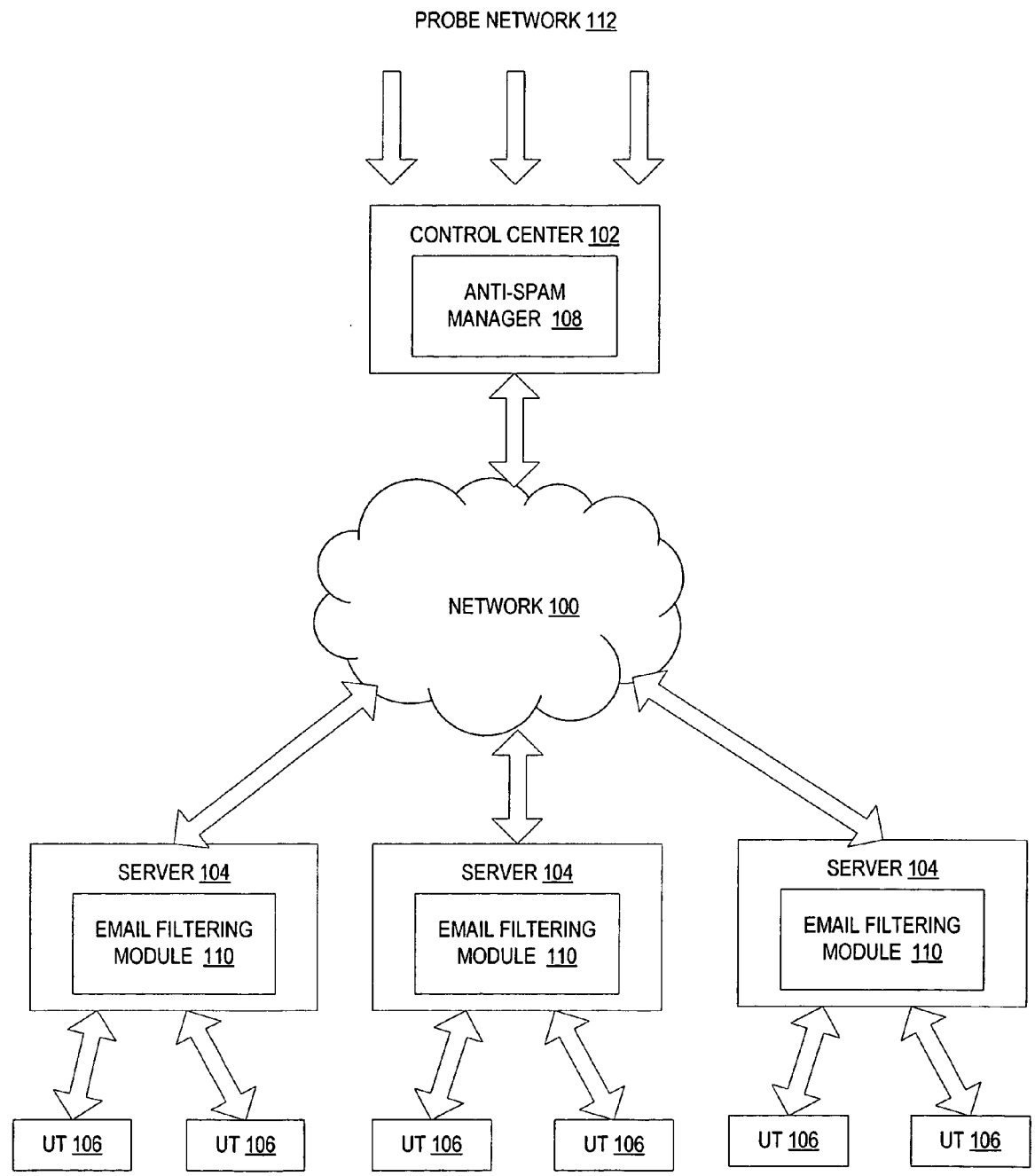
FIG. 1 is a block diagram of one embodiment of a system for controlling delivery of spam electronic mail.

A method and apparatus to maintain reputation lists of IP addresses for detection of email spam are described. In the following description, numerous details are set forth. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

FIG. 1 is a block diagram of one embodiment of a system for controlling delivery of spam electronic mail (email). The system includes a control center 102 coupled to a communications network 100 such as a public network (e.g., the Internet, a wireless network, etc.) or a private network (e.g., LAN, Intranet, etc.). The control center 102 communicates with multiple network servers 104 via the network 100. Each server 104 communicates with user terminals 106 using a private or public network.

The control center 102 is an anti-spam facility that is responsible for analyzing messages indicative of spam, developing filtering rules for detecting spam, and distributing the filtering rules to the servers 104. A message may be indicative of spam because it was collected via a "probe network" 112. In one embodiment, the probe network is formed by fictitious probe email addresses specifically selected to make their way into as many spammer mailing lists as possible. The fictitious probe email addresses may also be selected to appear high up on spammers' lists in order to receive spam mailings early in the mailing process (e.g., using the e-mail address "aardvark@aol.com" ensures relatively high placement on an alphabetical mailing list). The fictitious probe email addresses may include, for example, decoy accounts and expired domains. In addition, a certain percentage of assignable e-mail addresses offered by an ISP or private network may be reserved for use as probe email addresses. The probe network 112 may also receive email identified as spam by users of terminals 106.

A server 104 may be a mail server that receives and stores messages addressed to users of corresponding user terminals. Alternatively, a server 104 may be a different server (e.g., a gateway of an Internet Service Provider (ISP)) coupled to a mail server. Servers 104 are responsible for filtering email messages based on the filtering rules received from the control center 102. Servers 104 operate as clients receiving services of the control center 102.

In one embodiment, the control center 102 includes an anti-spam manager 108 that is responsible for identifying spam email messages resulted from distinct spam attacks, generating filters for the distinct spam attacks, and distributing the filters to the servers 104 for detection of spam email resulted from these spam attacks at the customer sites.

Each server 104 includes an email filtering module 110 that is responsible for storing filters received from the control center 102 and detecting spam email using these filters.

In an alternative embodiment, each server 104 hosts both the anti-spam manager 108 that generates spam filters and the email filtering module 110 that uses the generated filters to detect spam email.

In one embodiment, the email filtering module 110 is also responsible for collecting statistics pertaining to email messages and sending the statistics to the anti-spam manager 108. The statistics may specify the number of email messages received from each sender at the relevant server 104, the Internet Protocol (IP) address of each sender, and the percentage of spam identified in these email messages by the email filtering module 110. The anti-spam manager 108 receives statistics from various servers 104, creates lists of IP addresses and distributes the lists of IP addresses to the servers 104 that use these lists to filter email messages. The lists of IP addresses provide data indicating the reputation of IP addresses. For example, these lists may include a list of safe IP addresses, a list of suspicious IP addresses, a list of IP addresses of open proxies, etc.

Figure 2:
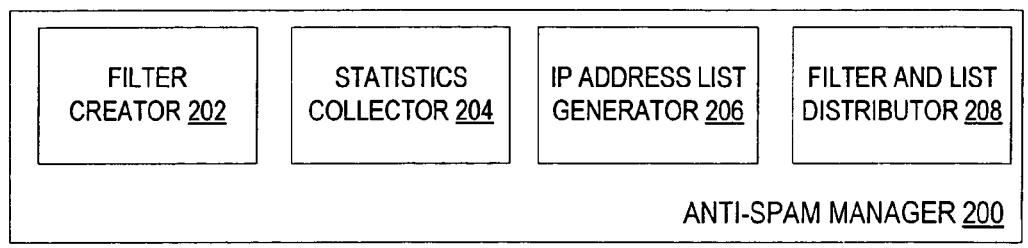
FIG. 2 is a block diagram of one embodiment of an anti-spam manager.

FIG. 2 is a block diagram of one embodiment of an anti-spam manager 200. The anti-spam manager 200 includes a filter creator 202, a statistics collector 204, an IP address list generator 206, and filter and list distributor 208.

The filter creator 202 is responsible for creating filters based on probe email messages. A filter may include a mathematical signature of a probe email message, a regular expression characterizing a probe email message, one or more URLs extracted from a probe email message, or any other data characterizing probe email messages resulted from a spam attack.

The filter and list distributor 208 is responsible for distributing filters to participating servers such as servers 104 of FIG. 1. In one embodiment, each server 104 periodically (e.g., each 5 minutes) initiates a connection (e.g., a secure HTTPS connection) with the control center 102. Using this pull-based connection, filters are transmitted from the control center 102 to the relevant server 104 for detection of spam email at relevant customer sites.

The statistics collector 204 is responsible for collecting statistics from servers 104. The statistics pertain to email messages processed at the servers 104 and may specify the number of email messages received from each sender at the relevant server 104, the IP address of each sender, and the percentage of spam detected in these email messages at the relevant server 104.

The IP address list generator 206 is responsible for creating lists of IP addresses. The lists of IP addresses provide data indicating the reputation of IP addresses and may include, for example, a list of safe IP addresses, a list of suspect IP addresses, a list of IP addresses of open proxies, etc. The list of safe IP addresses may be generated based on user input and may include IP addresses that generate a large number of email messages (e.g., 5,000 messages a day over the past 30 days), produce no spam, and have other characteristics as will be discussed in more detail below. The list of suspect IP addresses may be generated automatically based on statistics provided by servers 104 and may include IP addresses that generate a large number of email messages (e.g., 10,000 messages a day over the past 24 hours), produce spam, and have other characteristics as will be discussed in more detail below. The list of IP addresses of open proxies may be generated based on user input and may include IP addresses of proxy servers that are used as open mail relays, as will be discussed in more detail below.

The filter and list distributor 208 is responsible for distributing lists of IP addresses to participating servers 104. Once the current IP address lists are updated, they are re-distributed to the servers 104. Different IP address lists may be updated with different frequency. For example, the list of safe IP addresses may be updated weekly, the list of suspect IP addresses may be updated hourly, and the list of open proxy IP addresses may be updated daily.

If server 104 is a mail server at a customer site, it may use the lists of IP addresses, along with the anti-spam filters, to detect spam email. If server 104 is a gateway of an ISP, it may also use the lists of IP addresses to control incoming and/or outgoing traffic depending on the percentage of spam produced by email senders. For example, if an IP address generates a large number of email messages, and the suspect IP address list indicates that this IP address produces 50% spam, the ISP gateway may slow down the connection with this IP address by a factor of 2. If the suspect IP address list indicates that this IP address produces 90% spam, the ISP gateway may slow down the connection with this IP address by a factor of 50.

Figure 3:
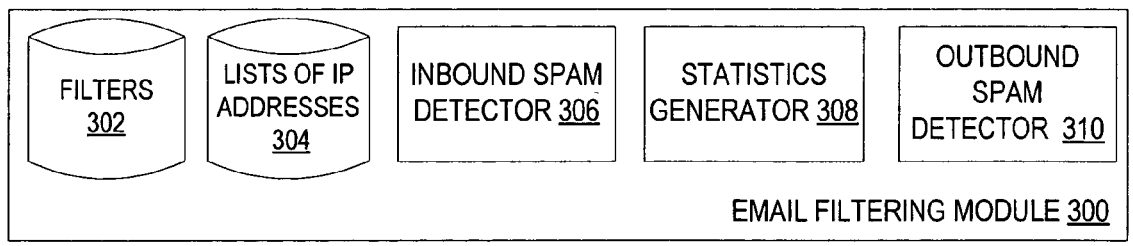
FIG. 3 is a block diagram of one embodiment of an email filtering module.

FIG. 3 is a block diagram of one embodiment of an email filtering module 300. The email filtering module 300 includes databases 302 and 304, an inbound spam detector 306, a statistics generator 308, and an outbound spam detector 310.

The database 302 stores filters received from the control center 102. A filter may include a mathematical signature of an email message indicative of spam (e.g., a probe email message), a regular expression characterizing an email message indicative of spam, one or more URLs extracted from an email message indicative of spam, or any other data characterizing an email message indicative of spam.

The database 304 stores IP address lists received from the control center 102. The IP address lists provide data indicating the reputation of IP addresses and may include, for example, a list of safe IP addresses, a list of suspect IP addresses, a list of IP addresses of open proxies, etc.

The inbound spam detector 306 is responsible for filtering incoming email messages using filters stored in the database 302 and IP address lists stored in the database 304. The filtering may be performed, in one embodiment, by comparing an IP address of a message sender with IP addresses from the lists of IP addresses. If a match is found, the message may be processed according to a predefined action. For example, the message may be delivered to its intended recipient, stopped, or further filtered using the filters stored in the database 302.

The outbound spam detector 310 is responsible for filtering outgoing email messages using IP address lists stored in the database 304. In one embodiment, if an IP address of a message sender matches an IP address from the list of open proxy IP addresses, this outgoing email message is blocked.

In an alternative embodiment, the outbound spam detector 310 is not part of the email filtering module 300. Instead, the outbound spam detector 310 may be an independent module or part of a different module that processes only outgoing email messages (e.g., email messages sent by UTs 106).

The statistics generator 308 is responsible for generating statistics pertaining to email messages processed by the email filtering module 300. The statistics may specify the number of email messages received from each sender, the IP address of each sender, the percentage of spam detected in these email messages, and characteristics of the IP address (e.g., whether it's an IP address of an open proxy).

Figure 4:
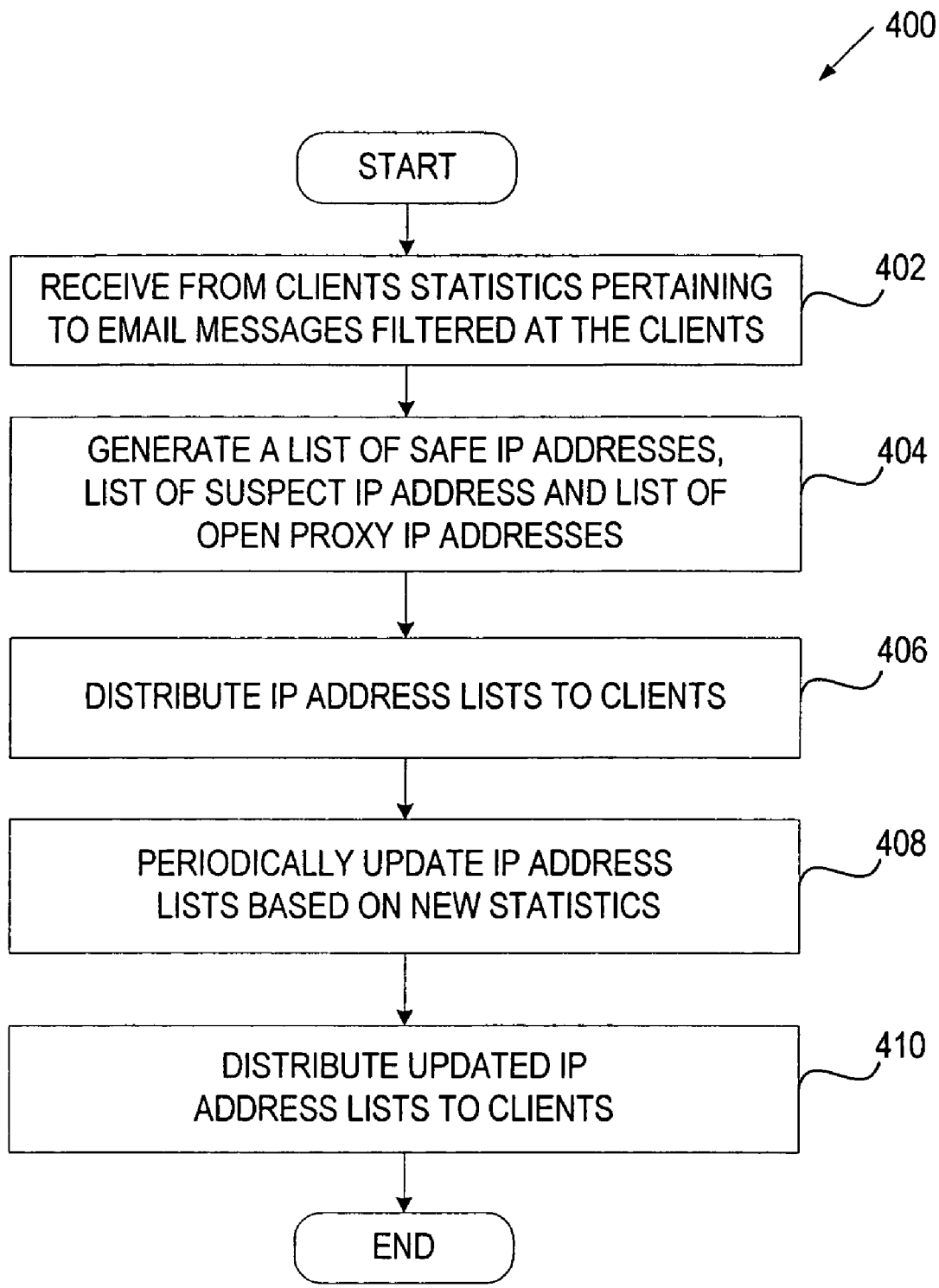
FIG. 4 is a flow diagram of one embodiment of a process for maintaining reputation lists of IP addresses.

FIG. 4 is a flow diagram of one embodiment of a process 400 for creating reputations lists of IP addresses. The process may be performed by processing logic that may comprise hardware (e.g., dedicated logic, programmable logic, microcode, etc.), software (such as run on a general purpose computer system or a dedicated machine), or a combination of both. In one embodiment, processing logic resides at a control center 102 of FIG. 1.

Referring to FIG. 4, process 400 begins with processing logic receiving, from clients, statistics pertaining to email messages filtered at the clients (processing block 402). The statistics may specify, for example, the number of email messages received by the client from each sender, the IP address of each sender, the percentage of spam detected in these email messages at the client, and characteristics of the IP address (e.g., whether it's an IP address of an open proxy).

At processing block 404, processing logic uses the statistics to generate reputation lists of IP addresses such as a list of safe IP addresses, a list of suspect IP addresses and a list of open proxy IP addresses. Exemplary reputation lists will be discussed in more detail below.

At processing block 406, processing logic distributes reputation lists of IP addresses to the clients.

At processing block 408, processing logic periodically updates reputation lists of IP addresses based on newly received statistics. Different IP address lists may be updated with different frequency. For example, the list of safe IP addresses may be updated weekly, the list of suspect IP addresses may be updated hourly, and the list of open proxy IP addresses may be updated daily.

At processing block 410, processing logic distributes updated reputation lists to the clients.

As discussed above, the reputation lists of IP addresses may include, for example, a list of safe IP addresses, a list of suspect IP addresses and a list of open proxy IP addresses. In one embodiment, the list of safe IP addresses is created based on user input and includes IP addresses having the following characteristics:

- IP addresses of machines that are not open proxies and are not included in the list of suspect IP;
- IP addresses producing no spam;
- IP addresses producing a large number of messages (e.g., 5,000 messages a day over the past 30 days);
- IP addresses that are not from reserved IP address spaces (e.g., Internet Assigned Number Authority (IANA) IP address space);
- IP addresses that are not blacklisted by trusted third parties (e.g., not on the Spamhaus Block List (SBL));
- IP addresses that are not dynamic in nature;
- IP addresses having valid hostnames in a lookup table of the domain name system (DNS);
- IP addresses that are not addresses of service providers; and
- IP addresses that are not internal IP addresses at the client.

In one embodiment, the control center 102 uses legitimate email filters to identify legitimate emails received at the control center 102. The list of safe IP addresses may include IP addresses generating legitimate emails as identified by the legitimate filters. In one embodiment, the list of safe IP addresses may also include IP addresses of known legitimate corporations (e.g., as manually specified by a user).

The list of safe IP addresses is updated periodically (e.g., once a week). In one embodiment, when an email filtering module at the client determines that an IP address of an incoming email message matches an IP address from the list of safe IP addresses, the email filtering module causes the incoming email message to be delivered to its intended recipient.

The list of open proxy IP addresses includes IP addresses of proxy servers (e.g., HTTP proxy servers) that are exploited to function as open mail relays and produce spam. Open proxies provide surrogate (proxy) communication ability to other servers through ports not reserved for normal use. Sometimes, a computer infected by a mass-mailer virus or program acting as a virus (e.g., Trojan horse program) may sent spam email, without knowledge or intention of its user. Such computers are known as zombie computers. In one embodiment, the list of open proxy computers includes IP addresses of zombie computers. In one embodiment, the list of open proxy IP addresses does not include addresses of proxy servers that run valid mail servers.

In one embodiment, the list of open proxy IP addresses is created based on user input and may include addresses of open proxies listed by trusted sources, addresses of open proxies identified based on statistics received from the clients, and addresses of open proxies identified based on probe email messages processed at the control center 102. In one embodiment, addresses of open proxies listed by trusted sources are included in the list of open proxy IP addresses if they are cross-referenced against the probe network 112. In one embodiment, the list of open proxy IP addresses is validated periodically (e.g., hourly) so that any proxies that have been closed (reconfigured) could be removed from the list in a short amount of time.

Figure 5:
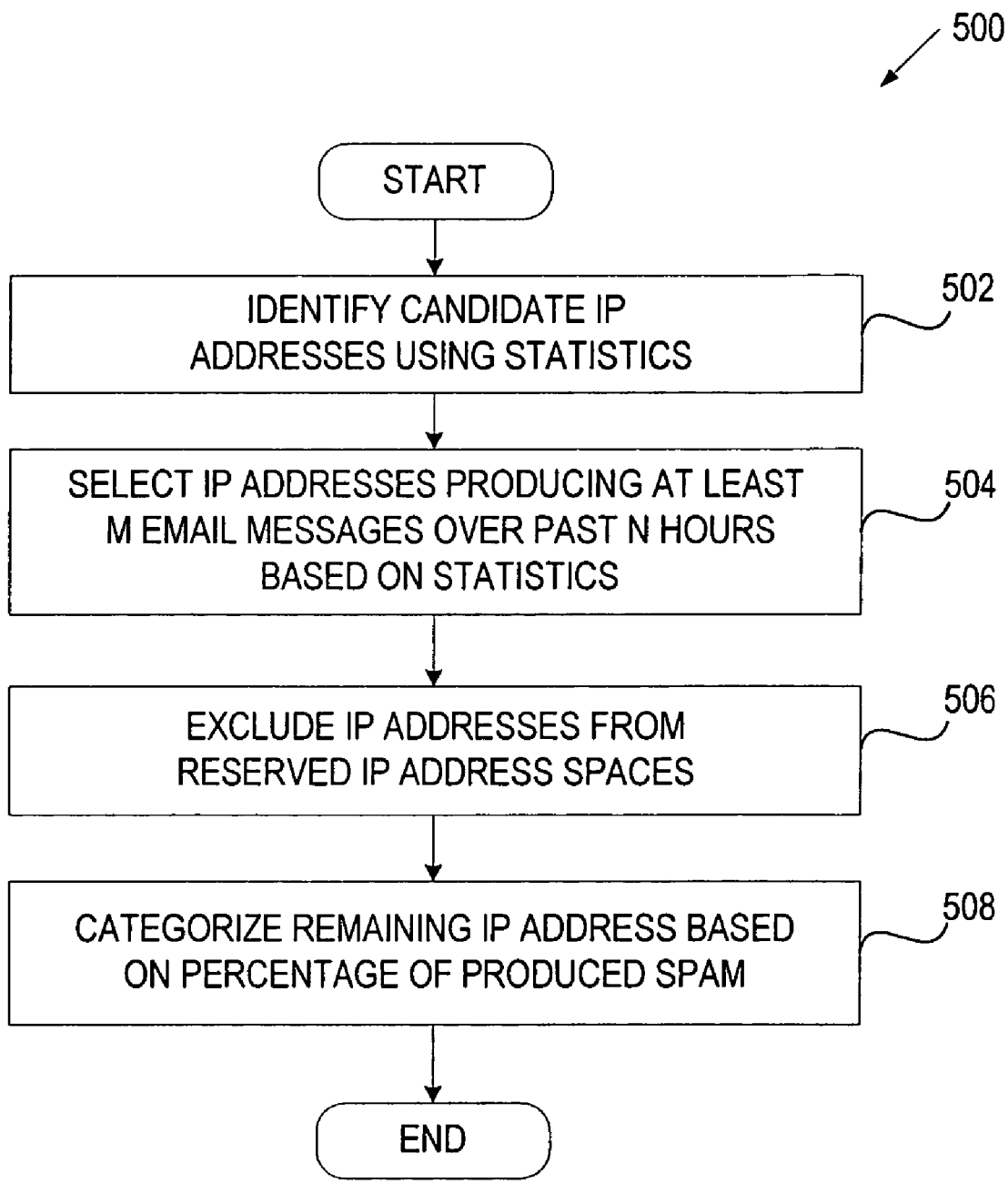
FIG. 5 is a flow diagram of one embodiment of a process for creating a list of suspect IP addresses.

In one embodiment, the list of suspect IP addresses is created automatically (without user interaction) based on statistics received from multiple clients. FIG. 5 is a flow diagram of one embodiment of a process 500 for creating a list of suspect IP addresses. The process may be performed by processing logic that may comprise hardware (e.g., dedicated logic, programmable logic, microcode, etc.), software (such as run on a general purpose computer system or a dedicated machine), or a combination of both. In one embodiment, processing logic resides at a control center 102 of FIG. 1.

Referring to FIG. 5, process 500 begins with processing logic identifying candidate IP addresses for the suspect list using statistics received from various clients (processing block 502). In one embodiment, a candidate IP address is an address that is not included in the list of safe IP addresses and is not associated with an open proxy.

At processing block 504, processing logic selects candidate IP addresses that produce at least M email messages during the past N hours (e.g., over 10,000 during the past 24 hours) and generate spam. The selection is based on the statistics received from the clients.

At processing block 506, processing logic excludes, from the selected IP addresses, IP addresses from reserved IP address spaces (e.g., IANA IP spaces).

At processing block 508, processing logic categorizes the remaining IP addresses based on the percentage of the produced spam. For example, the first category may include IP addresses producing over 90% spam, the second category may include IP addresses producing between 80% spam and 90% spam, the third d category may include IP addresses producing between 70% spam and 80% spam, the fourth category may include IP addresses producing between 70% spam and 60% spam, the fifth category may include IP addresses producing between 60% spam and 50% spam, the sixth category may include IP addresses producing between 50% spam and 40% spam, the seventh category may include IP addresses producing between 40% spam and 30% spam, the eighth category may include IP addresses producing between 30% spam and 20% spam, the ninth category may include IP addresses producing between 20% spam and 10% spam, and the tenth category may include IP addresses producing less than 10% spam.

In one embodiment, each category of suspect IP addresses is associated with a score. This score is subsequently used by the filtering module at the client as one of spam characteristics of an email message received from a suspect IP address. The score may also vary based on the top level domain (TLD) associated with the IP address. For example, the TLD of ".biz" may result in a higher score than the TLD of ".com". In one embodiment, if false positives associated with a suspect IP address are reported, the score associated with this IP address is lowered.

Figure 6:
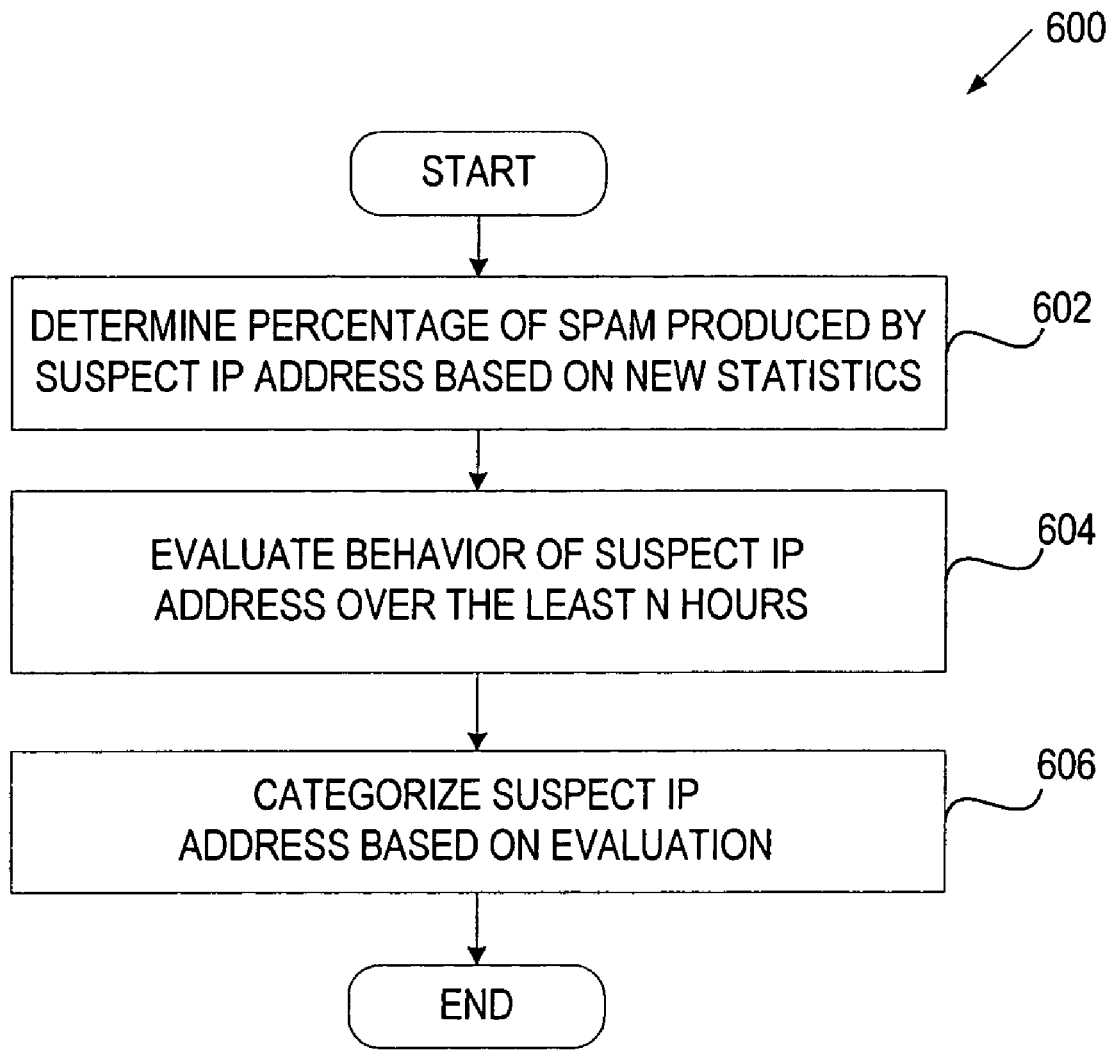
FIG. 6 is a flow diagram of one embodiment of a process for updating a list of suspect IP addresses.

The list of suspect IP addresses is automatically updated at predefined time intervals (e.g., every hour). FIG. 6 is a flow diagram of one embodiment of a process 600 for updating a list of suspect IP addresses. The process may be performed by processing logic that may comprise hardware (e.g., dedicated logic, programmable logic, microcode, etc.), software (such as run on a general purpose computer system or a dedicated machine), or a combination of both. In one embodiment, processing logic resides at a control center 102 of FIG. 1.

Referring to FIG. 6, process 600 begins with processing logic determining the current percentage of spam produced by a suspect IP address from the list (processing block 602). The current percentage of spam is determined based on new statistics received from the clients.

At processing block 604, processing logic evaluates the behavior of the suspect IP address with respect to spam over the last N hours (e.g., last 24 hours). The evaluation may be done to determine, for example, whether this IP address has been sending spam constantly, or only periodically, or only in the beginning of this time period, or only at the end of this time period, etc.

At processing block 606, processing logic categorizes the suspect IP address based on the evaluation. For example, if the suspect IP address has been sending spam only in the beginning of the time period under evaluation, processing logic may move this suspect IP address to a less "spammy" category.

FIGS. 7-10 are flow diagrams of various embodiments of a process for filtering email messages using reputation lists of IP addresses. The process may be performed by processing logic that may comprise hardware (e.g., dedicated logic, programmable logic, microcode, etc.), software (such as run on a general purpose computer system or a dedicated machine), or a combination of both. In one embodiment, processing logic resides at a server 104 of FIG. 1.

Figure 7:
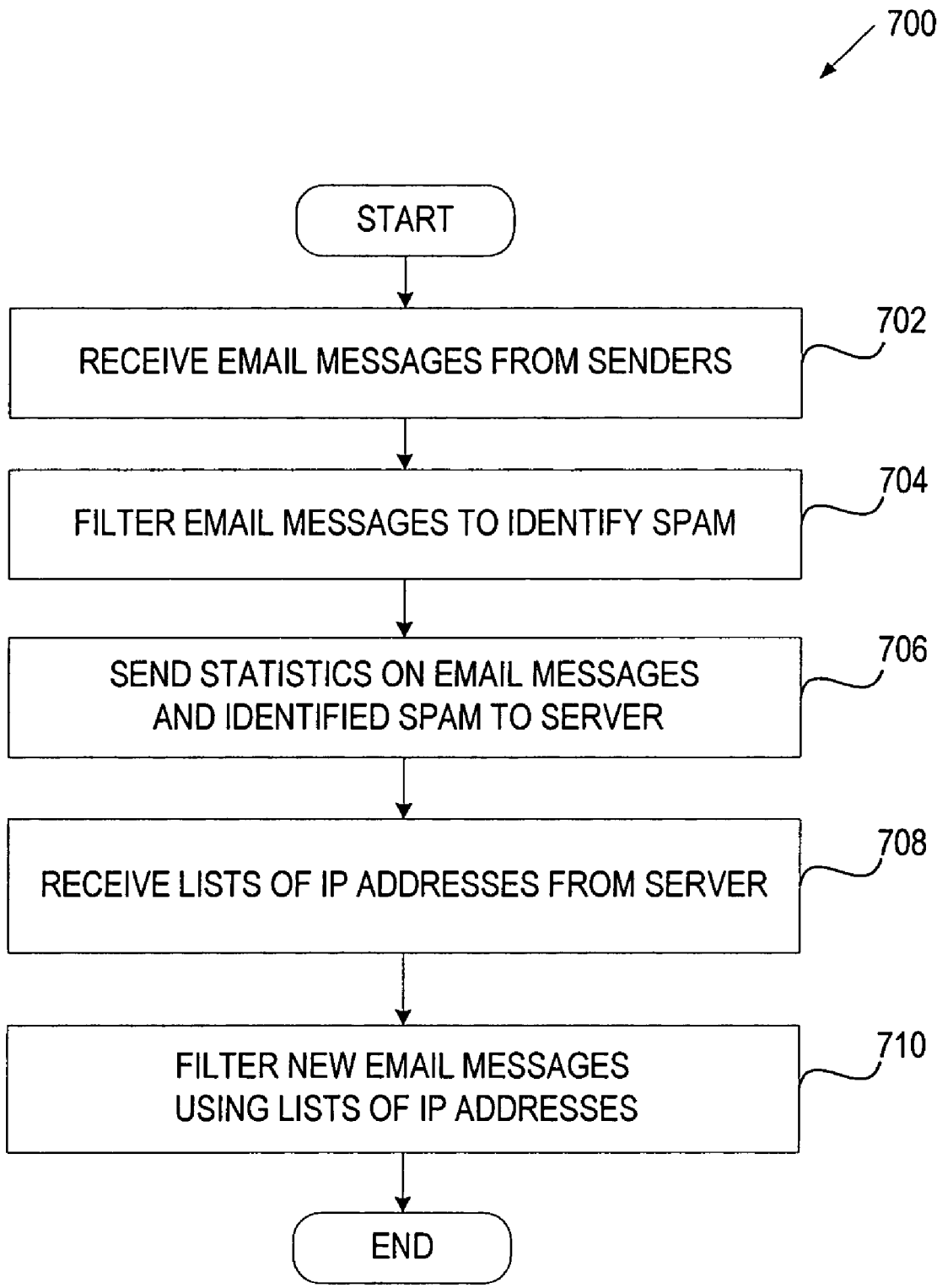
FIG. 7 is a flow diagram of one embodiment of a process for filtering email messages.

Referring to FIG. 7, process 700 begins with processing logic receiving email messages from senders (processing block 702). Each sender has an IP address as reflected in the header of an email message.

At processing block 704, processing logic filters email messages to identify spam. The filtering may be performed using filters created based on probe email messages.

At processing block 706, processing logic generates statistics pertaining to the processed email messages and sends it to the server (e.g., a control center 102 of FIG. 1). The statistics may specify, for example, the number of email messages received from each sender, the IP address of each sender, the percentage of spam detected in these email messages as a result of filtering, and characteristics of the IP address (e.g., whether it's an IP address of an open proxy).

At processing block 708, processing logic receives reputation lists of IP addresses from the server. The reputation lists are created based on the statistics and may include, for example, a list of safe IP addresses, a list of suspect IP addresses and a list of open proxy IP addresses.

At processing block 710, processing logic filters new email messages using the reputation lists of IP addresses. Exemplary embodiments of message filtering will be discussed in more detail below in conjunction with FIGS. 8-10.

Figure 8:
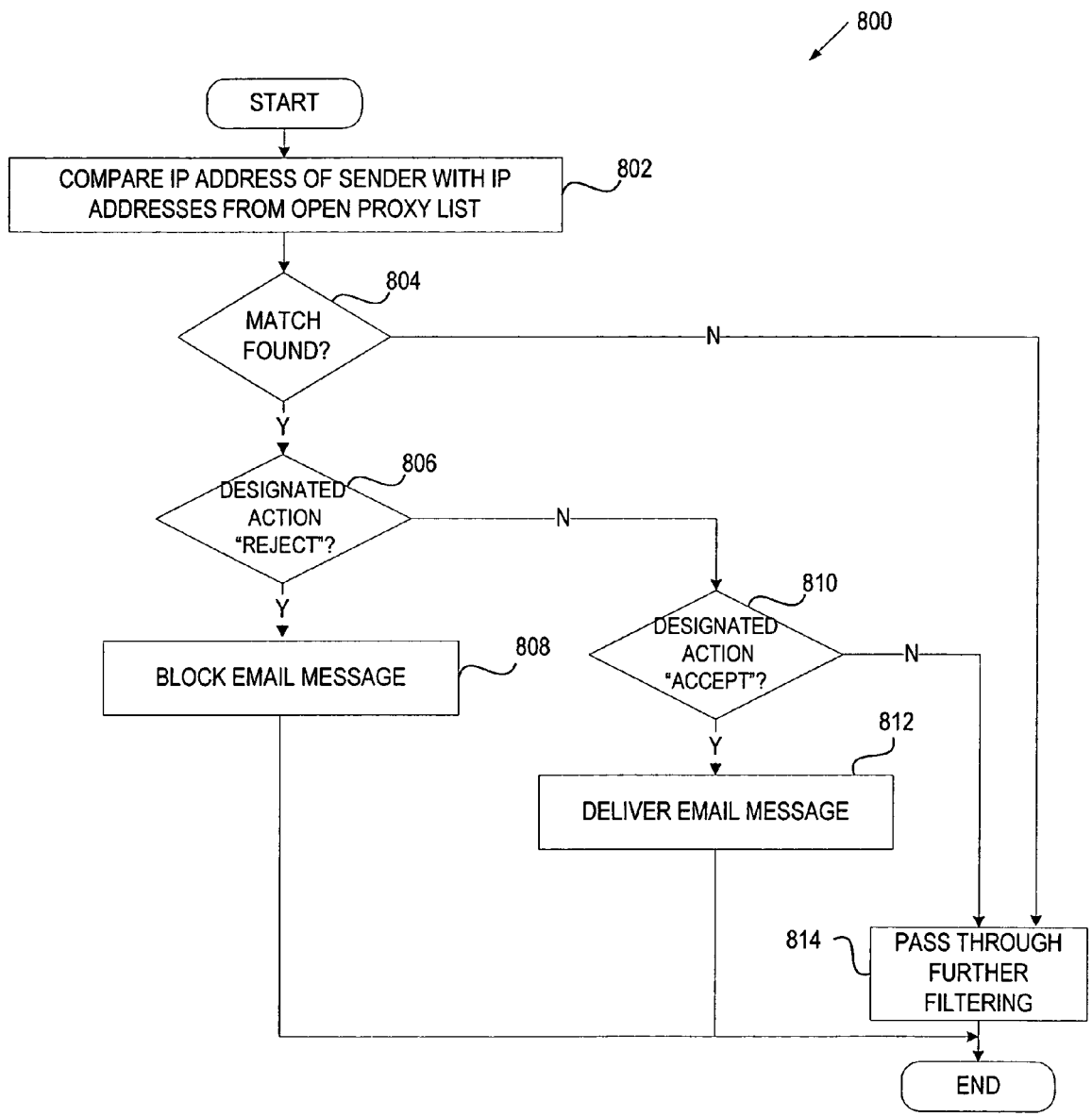
FIG. 8 is a flow diagram of one embodiment of a process for inbound filtering of email messages using a list of open proxy IP addresses.

FIG. 8 is a flow diagram of one embodiments of a process for inbound filtering using a list of open proxy IP addresses. Referring to FIG. 8, process 800 begins with processing logic receiving an incoming email message from a sender and comparing the IP address of the sender with IP addresses from the list of open proxy IP addresses (processing block 802).

If the IP address of the sender does not match any IP addresses from the list of open proxy IP addresses (processing block 804), processing logic passes the incoming email message through further filtering (processing block 814). The further filtering may include filtering using other reputation lists of IP addresses (e.g., the list of suspect IP addresses) and/or filters created based on probe email messages.

If a match is found (processing block 804), processing logic determines whether a designated action to be taken when the sender of the incoming message is an open proxy is "reject" (processing block 806). If so, the incoming email message is blocked (processing block 808). If not, processing logic determines whether the designated action is "accept" (processing block 810). If the designated action is "accept", processing logic causes the incoming email message to be delivered to its intended recipient (processor 812).

If the designated action is not "accept", processing logic decides that the designated action is "further filtering" and passes the incoming email message through further filtering (processing block 814). Hence, if the incoming email message came from a zombie computer, processing logic will make additional checks to ensure that this email message is really spam.

Figure 9:
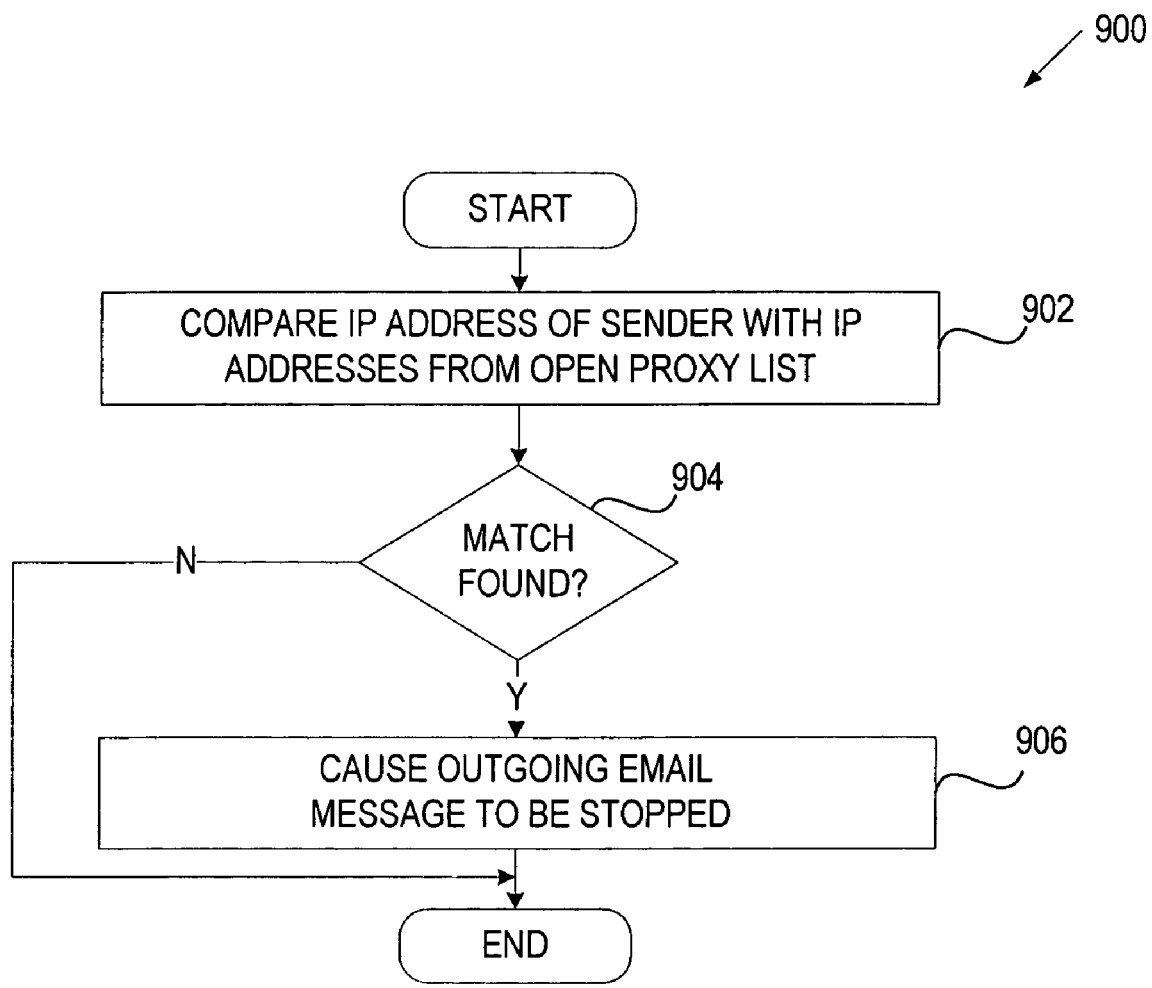
FIG. 9 is a flow diagram of one embodiment of a process for outbound filtering of email messages using a list of open proxy IP addresses.

FIG. 9 is a flow diagram of one embodiments of a process for outbound filtering using a list of open proxy IP addresses. Referring to FIG. 9, process 900 begins with processing logic identifying an outgoing email message sent by a user and comparing the IP address of the user with IP addresses from the list of open proxy IP addresses (processing block 902).

If the IP address of the user does not match any IP addresses from the list of open proxy IP addresses (processing block 904), processing logic allows the outgoing message to proceed to its intended destination. If the IP address of the user matches an IP address from the list of open proxy IP addresses (processing block 904), processing logic causes the outgoing messages to be stopped (processing block 906). Hence, process 900 operates at the customer site to prevent users at the customer site from distributing spam. As discussed above, a user at the customer site may be using a zombie computer that produces spam without the user's knowledge or intention.

Figure 10:
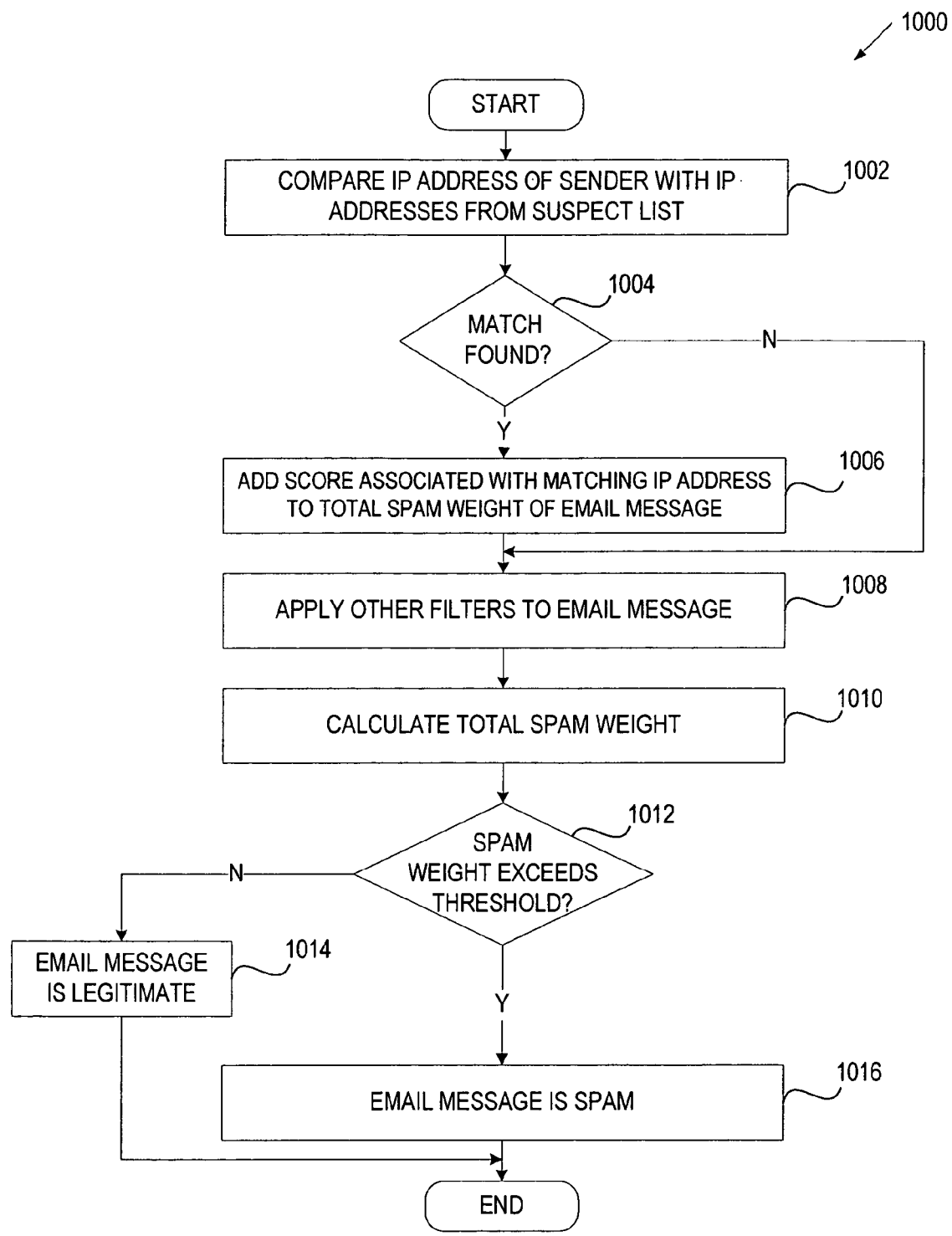
FIG. 10 is a flow diagram of one embodiment of a process for filtering email messages using a list of suspect IP addresses.

FIG. 10 is a flow diagram of one embodiment of a process for filtering email messages using a list of suspect IP addresses. Referring to FIG. 10, process 1000 begins with receiving an incoming email message and comparing the IP address of the sender of the incoming email message with IP addresses from the list of suspect IP addresses (processing block 1002).

If no match is found (processing block 1004), processing logic proceeds to processing block 1008. If a match is found, processing logic adds the score associated with the matching IP address to the total spam weight of this email message (processing block 1006). As discussed above, in one embodiment, the list of suspect IP addresses may specify for each suspect IP address a category characterizing the spam nature of the relevant IP address. Each category is associated with a score that corresponds to the percentage of spam produced by IP addresses within the relevant category.

At processing block 1008, processing logic applies other filters to the other email message. These other filters may include mathematical signatures of email messages indicative of spam (e.g., probe email messages), regular expressions characterizing email messages indicative of spam, URLs extracted from email message indicative of spam, or any other data characterizing email messages indicative of spam. Each filter is associated with a score.

At processing block 101, processing logic adds the score associated with each filter producing a match with the incoming email message to the total spam weight of the incoming email message. If the total spam weight of the incoming email message exceeds the threshold (processing block 1012), processing logic considers the incoming email message to be spam (processing block 1016). Otherwise, processing logic considers the incoming email message to be legitimate (processing block 1014).

Figure 11:
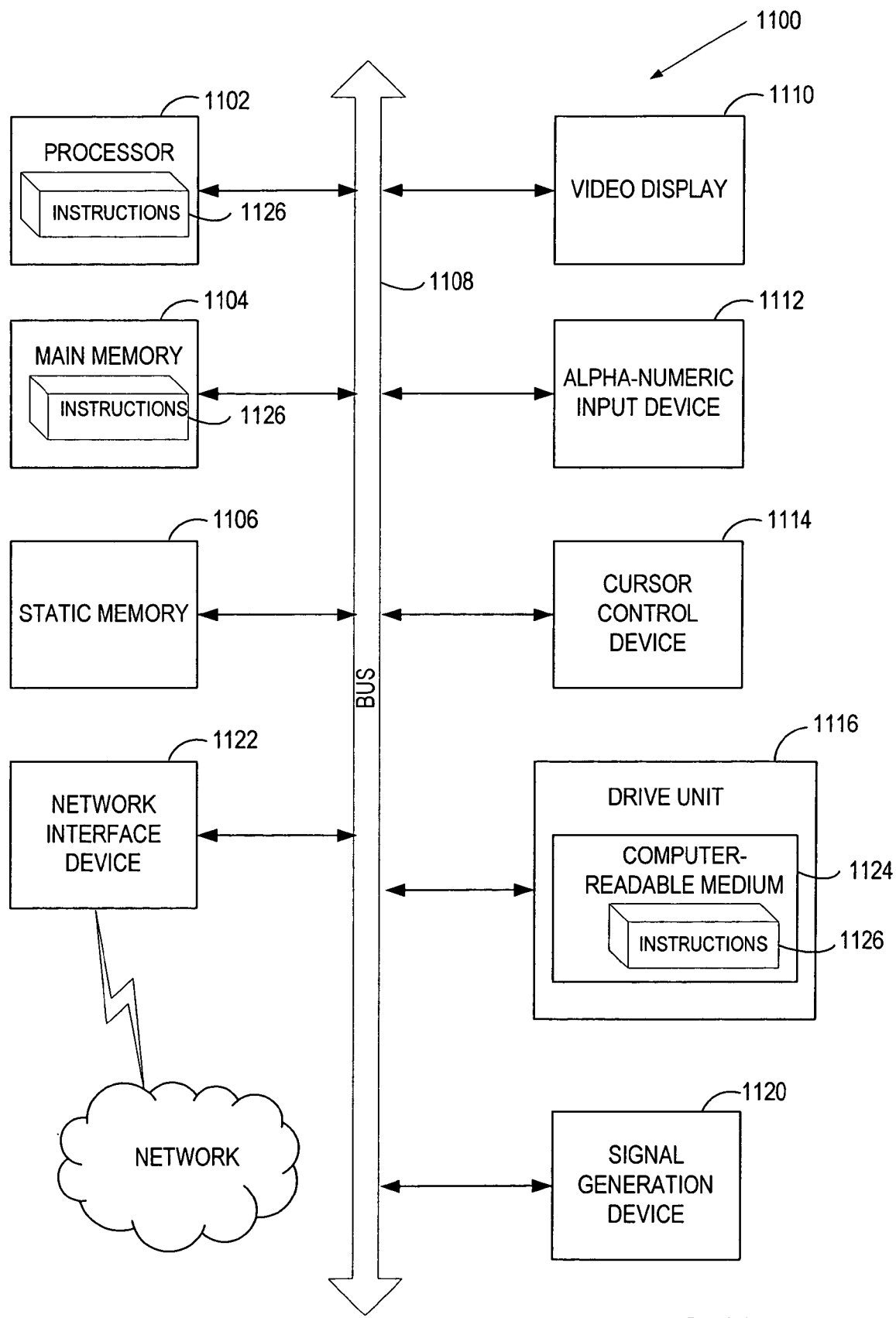
FIG. 11 is a block diagram of an exemplary computer system.

FIG. 11 is a block diagram of an exemplary computer system 1100 that may be used to perform one or more of the operations described herein. In alternative embodiments, the machine may comprise a network router, a network switch, a network bridge, Personal Digital Assistant (PDA), a cellular telephone, a web appliance or any machine capable of executing a sequence of instructions that specify actions to be taken by that machine.

The computer system 1100 includes a processor 1102, a main memory 1104 and a static memory 1106, which communicate with each other via a bus 1108. The computer system 1100 may further include a video display unit 1110 (e.g., a liquid crystal display (LCD) or a cathode ray tube (CRT)). The computer system 1100 also includes an alpha-numeric input device 1112 (e.g., a keyboard), a cursor control device 1114 (e.g., a mouse), a disk drive unit 1116, a signal generation device 1120 (e.g., a speaker) and a network interface device 1122.

The disk drive unit 1116 includes a computer-readable medium 1124 on which is stored a set of instructions (i.e., software) 1126 embodying any one, or all, of the methodologies described above. The software 1126 is also shown to reside, completely or at least partially, within the main memory 1104 and/or within the processor 1102. The software 1126 may further be transmitted or received via the network interface device 1122. For the purposes of this specification, the term "computer-readable medium" shall be taken to include any medium that is capable of storing or encoding a sequence of instructions for execution by the computer and that cause the computer to perform any one of the methodologies of the present invention. The term "computer-readable medium" shall accordingly be taken to included, but not be limited to, solid-state memories, optical and magnetic disks, and carrier wave signals.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

We claim:

1. A method comprising:
 a computer system receiving, from a server, a safe list of safe IP addresses, wherein the computer system is configured to accept email messages having IP addresses included in the safe list;
 the computer system receiving, from the server, a suspect list of suspect IP addresses, wherein the computer system is configured to block email messages having IP addresses included in the suspect list;

the computer system receiving, from the server, an open proxy list, wherein the open proxy list includes IP addresses only of proxy servers that have been identified as currently being configured to have open mail relays, wherein the open proxy list includes first and second IP addresses corresponding to first and second proxy servers, respectively, and wherein the open proxy list also specifies designated actions for mail received via the first and second proxy servers;

the computer system receiving a plurality of email messages that includes a first email message and a second email message;

the computer system filtering the plurality of email messages, wherein the filtering includes:

the computer system determining from the open proxy list that the first email message includes the first IP address;

the computer system determining from the open proxy list that the second email message includes the second IP address;

the computer system blocking the first email message as spam in response to the open proxy list having a designated action of reject for the first IP address;

the computer system delivering the second email message in response to the open proxy list having a designated action of accept for the second IP address; and the computer system receiving an updated open proxy list from the server, wherein the updated open proxy list has been updated by removing IP addresses of proxy servers that have been closed or reconfigured.

2. The method of claim 1, further comprising:
the computer system sending, to a server, statistics pertaining to spam in the plurality of email messages, wherein the safe list, the suspect list, and the open proxy list are generated by the server based at least in part on the statistics.

3. The method of claim 1, wherein the open proxy list includes IP addresses of open proxies identified based on probe email messages processed at the server.

4. The method of claim 1, wherein the open proxy list and the suspect list are updated at different time intervals.

5. The method of claim 1, wherein the suspect list is updated more frequently than the open proxy list.

6. The method of claim 1, wherein the suspect list is generated automatically by the server, and wherein the open proxy list is generated, based at least in part, on user input.

7. A method, comprising:
receiving, at a computer system from a plurality of clients, statistics pertaining to a plurality of email messages;

the computer system generating a safe list, wherein ones of the plurality of clients that receive the safe list are configured to accept email messages having IP addresses included in the safe list;

the computer automatically generating a suspect list, wherein ones of the plurality of clients that receive the suspect list are configured to block email messages having IP addresses included in the suspect list, wherein the generating is based at least in part on the received statistics;

the computer system generating an open proxy list, wherein the open proxy list includes IP addresses only of proxy servers currently configured as open mail relays, and wherein the open proxy list includes, for a first IP address, a designated action indicating that an email message having the first IP address is to be blocked, and wherein the open proxy list includes, for a second IP address, a designated action indicating that an email message having the second IP address is to be accepted;

the computer system distributing the safe list, the suspect list and the open proxy list to the plurality of clients for use in classifying received email messages; and the computer system updating the open proxy list, wherein the updating includes removing IP addresses of proxy servers that have been closed or reconfigured; and the computer system distributing the updated open proxy list to ones of the plurality of clients.

8. The method of claim 7, wherein the open proxy list is generated based at least in part on user input.

9. The method of claim 7, further comprising updating the suspect list and the open proxy list at different time intervals.

10. The method of claim 9, wherein the open proxy list includes IP addresses of open proxies identified based on received statistics pertaining to probe email messages.

11. A non-transitory computer readable medium having program instructions stored thereon that if executed on a processing system cause said processing system to perform operations comprising:

receiving, from a server, a safe list of safe IP addresses, wherein the processing system is configured to accept email messages having IP addresses included in the safe list;

receiving, from the server, a suspect list of suspect IP addresses, wherein the processing system is configured to block email messages having IP addresses included in the suspect list;

receiving, from the server, an open proxy list, wherein the open proxy list has open proxy IP addresses only of proxy servers that have been identified as being open mail relays, and wherein the open proxy list includes designated actions for email messages, including a first designated action indicating that email from a first open proxy IP address is to be blocked, and including a second designated action indicating that email from a second open proxy IP address is to be accepted;

filtering a received email message using a designated action specified in the open proxy list; and receiving an updated open proxy list, wherein IP addresses of proxy servers that have been closed or reconfigured have been removed from the updated open proxy list.

12. The non-transitory computer readable medium of claim 11, wherein the open proxy list includes IP addresses of open proxies identified based on probe email messages processed at the server.

13. The non-transitory computer readable medium of claim 11, wherein the operations further comprise sending spam statistics to the server, wherein the suspect list is automatically generated based on the spam statistics, and wherein the open proxy list is generated based on user input.

* * * * *